(12) United States Patent
Matsui

(10) Patent No.: US 7,345,794 B2
(45) Date of Patent: Mar. 18, 2008

(54) DOCUMENT READING APPARATUS AND DOCUMENT READING METHOD

(75) Inventor: Noriaki Matsui, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1024 days.

(21) Appl. No.: 10/358,230

(22) Filed: Feb. 5, 2003

(65) Prior Publication Data

US 2003/0164991 A1    Sep. 4, 2003

(30) Foreign Application Priority Data

Feb. 6, 2002    (JP) .............................. 2002-030055

(51) Int. Cl.
*H04N 1/04* (2006.01)

(52) U.S. Cl. ..................... 358/474; 358/1.16; 358/539; 358/1.19; 358/1.17; 382/232; 382/233; 382/235

(58) Field of Classification Search ................ 358/474, 358/1.15, 401, 1.2, 1.19, 1.16, 505, 1.17, 358/539, 540, 404, 426.1, 416.07; 399/179, 399/369, 400, 403; 271/9.01–9.06; 355/313, 355/218; 382/232, 233, 235

See application file for complete search history.

(56) References Cited

U.S. PATENT DOCUMENTS

| 5,019,916 | A | * | 5/1991 | Ogura ........................ 358/401 |
| 5,680,198 | A | * | 10/1997 | Ohnishi ....................... 355/23 |
| 5,809,183 | A | | 9/1998 | Serizawa et al. ............ 382/301 |
| 5,987,227 | A | * | 11/1999 | Endo et al. .................. 358/1.13 |
| 6,002,849 | A | * | 12/1999 | Koh et al. ................... 358/1.18 |
| 6,050,732 | A | * | 4/2000 | Tsusaka ........................ 400/76 |
| 6,094,552 | A | * | 7/2000 | Haneda et al. ............... 399/193 |
| 6,244,585 | B1 | * | 6/2001 | Yoshiura et al. ............ 271/9.01 |
| 6,281,983 | B1 | * | 8/2001 | Takahashi et al. ........... 358/1.2 |
| 6,393,252 | B1 | * | 5/2002 | Yamagishi .................. 399/401 |
| 6,760,131 | B2 | * | 7/2004 | Kaji ............................. 358/474 |
| 7,061,637 | B2 | * | 6/2006 | Mochimaru et al. ........ 358/1.15 |

FOREIGN PATENT DOCUMENTS

| JP | 1-194658 | 8/1989 |
| JP | 8-22536 | 1/1996 |
| JP | 9-205524 | 8/1997 |
| JP | 10-294830 | 4/1998 |
| JP | 11-69087 | 3/1999 |
| JP | 11-136444 | 5/1999 |
| JP | 11-252288 | 9/1999 |
| JP | 2003-189065 | 7/2003 |

* cited by examiner

*Primary Examiner*—Douglas Q. Tran
*Assistant Examiner*—Negussie Worku
(74) *Attorney, Agent, or Firm*—Fitzpatrick, Cella, Harper & Scinto

(57) ABSTRACT

In a simultaneous double-sided document reading, this invention controls by software the document reading order to store image data in a single image storage device in the same order as a document page sequence. The copying apparatus has a reader unit, a printer unit, a controller unit and a document supply control unit. The controller unit has a reader memory, an encoder and a decoder. The reader memory temporarily stores at least two pages of uncompressed image data read from the document by the reader unit. The encoder compresses the image data stored in the reader memory. The compressed image memory stores a plurality of pages of image data compressed by the encoder. The decoder analyzes (expands) the compressed image data stored in the compressed image memory and maps it on the page memory.

14 Claims, 11 Drawing Sheets

| JOB | SERIES STEP NO. | READ NO. | STATUS | |
|---|---|---|---|---|
| 1 | 1 | 1 | READING FINISHED | ← 901 |
| | 2 | 2 | READING FINISHED | ← 902 |
| | 3 | 3 | READING FINISHED | ← 903 |
| | 4 | 4 | READING FINISHED | ← 904 |
| | 5 | 5 | READING FINISHED | ← 905 |
| | 6 | 6 | READING FINISHED | ← 906 |
| 2 | 7 | 1 | READING FINISHED | ← 907 |
| | 8 | 3 | READING FINISHED | ← 908 |
| | 9 | 2 | READING FINISHED | ← 909 |
| | 10 | 5 | LOCKED | ← 910 |
| | 11 | | | |
| | 12 | | | |
| | 13 | | | |
| | 14 | | | |
| | 15 | | | |
| | 16 | | | |
| | 17 | | | |
| | 18 | | | |
| | 19 | | | |
| | 20 | | | |

FIG.10

DOCUMENT READING APPARATUS AND DOCUMENT READING METHOD

This application claims priority from Japanese Patent Application No. 2002-030055 filed Feb. 6, 2002, which is incorporated hereinto by reference.

BACKGROUND OF THE INVENTION

1. Field of the Invention

The present invention relates to a document reading apparatus and a document reading method and more specifically to a document reading apparatus and a document reading method that are applied to digital copying machines or the like which read an image from a document placed on a document reading apparatus or image forming apparatus and form the image on print media.

2. Description of the Related Art

In common image forming apparatus such as digital copying machines, image data read from a document has conventionally been compressed into predetermined coded data before being stored in memory, rather than being stored as is in memory. The image forming apparatus then reads the coded data from memory as requested by the system, decodes it into original image data and outputs the decoded image data to an image forming unit.

For an improved document reading performance, an image forming apparatus with a double-sided reading function (reading both sides of originals as they are transported) is available, as described in Japanese Patent Application Laid-Open No. 10-294830 (1998). Compared with a conventional apparatus using a one-sided reading system, which performs the steps of reading one side of an original to form an image on paper and then flipping the original and reading the other side in an inverted pass to form a back side image on the other side of the paper, the currently available image forming apparatus with a simultaneous double-sided reading function has advantages that because both sides of the original are read at once, the document reading speed does not differ from that of the one-sided reading and that a monotonous document transport path can reduce possible damages to the original.

Further, in the image forming apparatus with the double-sided reading function, it is proposed, as in Japanese Patent Application Laid-Open No. 11-69087 (1999), to arrange image reading sensors in a curved paper path to minimize the size of the apparatus. In reality, to avoid an unwanted backside see-through phenomenon when the document is illuminated, the image reading sensors are disposed at some distance from each other.

In the image forming apparatus with the above-described read-as-document-moves scanning function, however, it is necessary to prepare two image storage devices, giving rise to a problem of an increased cost. This problem in the double-sided reading may be addressed, as described in Japanese Patent Laid-Open No. 8-22536, by temporarily storing the back side image data in a buffer memory to allow the front side image data to be compressed and stored first, followed by the back side image data in the buffer memory being compressed and stored. This enables the image forming apparatus to have only one image storage device.

This arrangement, however, can only apply to a case where the front and back side image data is read almost at the same time or where the completion of the front side reading is followed by the completion of the back side reading.

A user may wish to read images of a variety of sizes of documents, such as A4 and B5 sizes and even smaller sizes of A5 and B6, by the read-as-document-moves scanning method. If a document to be read is as small as A5 or B6, for example, the length of the document in the transport direction may be shorter than the paper pass distance between the front side sensor and the back side sensor. In that case, when a plurality of pages are read, the order of document reading may become irregular, such as page 1 front followed by page 2 front followed by page 1 back. Copying or FAX transmission of such image data as is will pose a problem that the image data will be processed in an irregular order.

SUMMARY OF THE INVENTION

The present invention has been accomplished with a view to overcoming these problems and provides a document reading apparatus and a document reading method which control by software a document reading order in the simultaneous double-sided document reading process so that the document images can be stored in a single image storage device in exactly the same order as a document page sequence.

To achieve this objective, the present invention provides a document reading apparatus comprising: a first document reader for reading a first side of a document while the document is being transported; a second document reader for reading a second side of the document while the document is being transported, thereby producing a image data of the first and second sides of the document; a memory for storing the image data of the first and second sides of the document; and a controller for reading out the image data stored in the memory in such a way that the image data is rearranged in accordance with the predetermined page order of document, regardless of an order of pages of the document stored in the memory.

The predetermined order means that a storing of the image data of the first side and a storing of the image data of the second side are alternately completed.

If a length of the double-sided document in the transport direction is shorter than a paper transport distance between the first document reader and the second document reader, the image data of the first and second sides is not stored in the predetermined order.

The memory has at least a first memory and a second memory, and the image data of the first and second sides is first stored in the first memory and then read from the first memory, compressed and stored in the second memory. The image data stored in the first memory not in the predetermined order are halted from being compressed and stored in the second memory.

Upon completion of the storing in the first memory of that image data which corresponds to a second side of a the halted image data, the halted image data is compressed.

Upon completion of the storing in the first memory of that image data which corresponds to a second side of the halted image data, a first of a plurality of the halted image data completely mapped in the first memory is compressed and accumulated.

The memory has at least a first memory and a second memory, and the image data of the first and second sides is first stored in the first memory and then read from the first memory, compressed and stored in the second memory; wherein an accumulated image management unit is provided which manages the image data accumulated by a compression and accumulation unit and, the accumulated image management unit locks the accumulated image data from being accessed, regardless of an order of pages of the document stored in the memory.

Upon completion of the storing the image data which corresponds to a second side of a locked image data in the second memory, the accumulated image management unit unlocks the locked image data.

Upon completion of storing the image data which corresponds to a second side of a locked image data in the second memory, the accumulated image management unit unlocks the first locked image data of a plurality of the locked image data.

A read-out number setting unit is provided which sets a read-out number representing an order in which the image data stored in the storage unit is read out and, the read-out number setting unit skips or advances the read-out number of the accumulated image data by one, regardless of an order of page of the document stored in the memory.

The memory has at least a first memory and a second memory, and the image data of the first and second sides is first stored in the first memory and then read from the first memory, compressed and stored in the second memory; wherein upon completion of the storing in the second memory of that image data which corresponds to a second side of skipped image data, the read-out number setting unit assigns a skipped, unused read-out number to the image data corresponding to the second side of the skipped image data.

The memory has at least a first memory and a second memory, and the image data of the first and second sides is first stored in the first memory and then read from the first memory, compressed and stored in the second memory; wherein upon completion of the storing the image data which corresponds to a second side of a skipped image data in the second memory, the read-out number setting unit assigns the first skipped, unused read-out numbers to the image data corresponding to the second side of the skipped image data of a plurality of the skipped image data.

Further, a document reading method is provided which comprising: a first document reading step of reading a first side of a document while the document is being transported; a second document reading step of reading a second side of the document while the document is being transported, thereby producing a image data of the first and second sides of the document; a storing step for storing the image data of the first and second sides of the document; and a controlling step of reading out the image data stored in the memory in such a way that the image data is rearranged in accordance with the predetermined page order of document, regardless of an order of pages of the document stored in the memory.

Further, a computer program product for executing a document reading method comprising: a first program code means for reading a first side of a document while the document is being transported; a second program code means for reading a second side of the document while the document is being transported, the first and second document reading steps producing image data of the first and second sides of the document; a third program code means for storing the image data of the first and second sides of the document; and a forth program code means for reading out the image data stored in the memory in such a way that the image data is rearranged in accordance with the predetermined page order of document, regardless of an order of pages of the document stored in the memory.

Further, a computer program product having a computer-readable recording medium and a program stored in the recording medium, wherein the program comprises: a first program code means for reading a first side of a document while the document is being transported; a second program code means for reading a second side of the document while the document is being transported, the first and second document reading steps producing image data of the first and second sides of the document; a third program code means for storing the image data of the first and second sides of the document; and a forth program code means for reading out the image data stored in the memory in such a way that the image data is rearranged in accordance with the predetermined page order of document, regardless of an order of pages of the document stored in the memory.

Further, an image forming apparatus comprising: a first document reader for reading a first side of a document while the document is being transported; a second document reader for reading a second side of the document while the document is being transported, thereby producing a image data of the first and second sides of the document; a memory for storing the image data of the first and second sides of the document; and a controller for reading out the image data stored in the memory in such a way that the image data is rearranged in accordance with original page order of document, regardless of a document reading completion page order differs from an original page order of document.

Further, a document reading apparatus comprising: a first document reader for reading a first side of a document while the document is being transported; a second document reader for reading a second side of the document while the document is being transported, thereby producing a image data of the first and second sides of the document; a memory for storing the image data of the first and second sides of the document; and a controller for reading out the image data stored in the memory in such a way that the image data is rearranged in accordance with the predetermined page order of document from the memory, regardless of an order of pages of the document stored in the memory.

With this invention, in simultaneously reading both sides of a plurality of document pages in a double-sided reading mode, if the front side reading and the back side reading fail to be completed in the same order as a document page sequence because of the document size, the image compression process can be controlled by software to allow the image data to be stored in a single image storage device in a correct document page sequence. Further, by performing appropriate setting by software when reading out the compressed image data, it is possible to read out the image data from the single image storage device in the same order as the document page sequence. This in turn allows the read image data to be copied or FAX-transmitted in a correct page number sequence.

The above and other objects, effects, features and advantages of the present invention will become more apparent from the following description of embodiments thereof taken in conjunction with the accompanying drawings.

BRIEF DESCRIPTION OF THE DRAWINGS

FIG. 10 illustrates an example of an accumulated image data management table according to Embodiment 2 of the invention.

DETAILED DESCRIPTION OF PREFERRED EMBODIMENTS

Now, embodiments of the present invention will be described by referring to the accompanying drawings.

Embodiment 1

Figure 2:
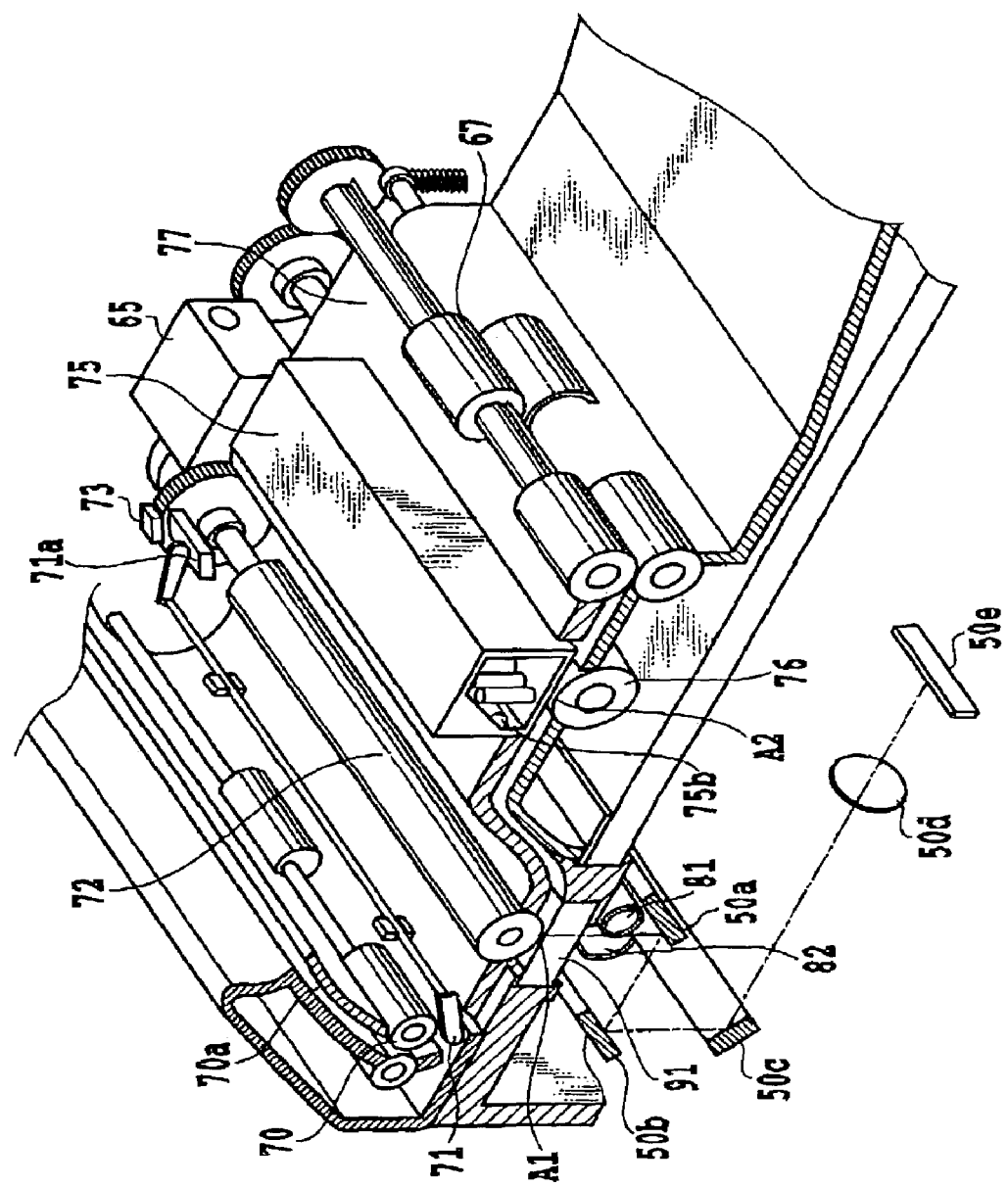
FIG. 2 is a partly cutaway perspective view showing an essential-part, internal construction of the copying apparatus according to Embodiment 1 of the invention.
Figure 3:
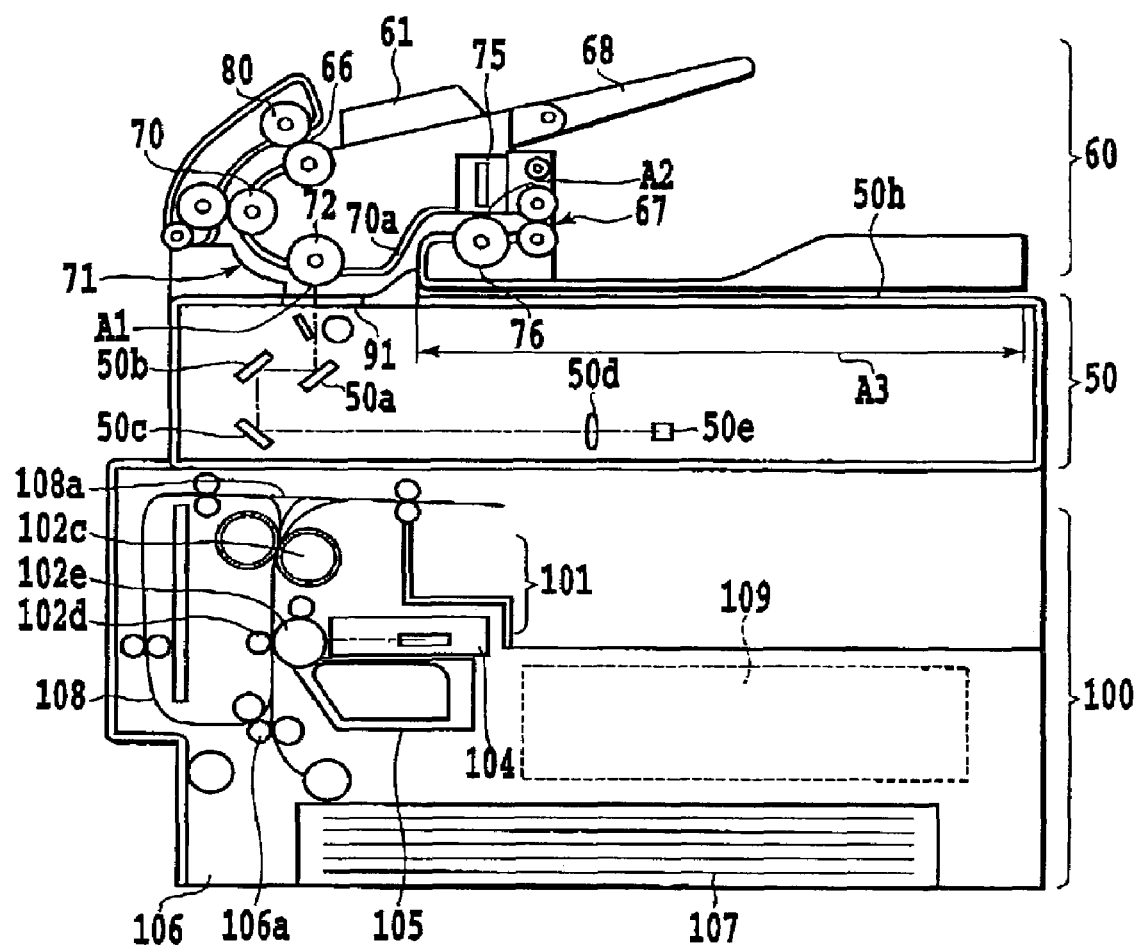
FIG. 3 is a schematic view showing an overall internal construction of the copying apparatus according to Embodiment 1 of the invention
Figure 4:
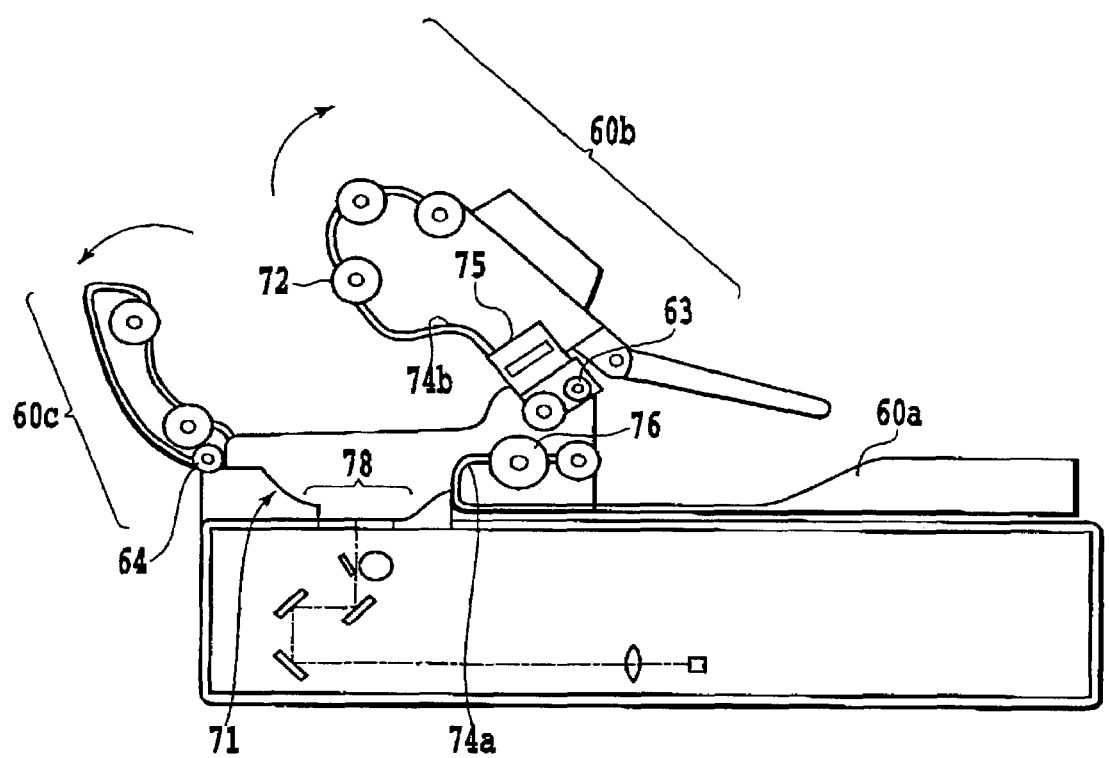
FIG. 4 is a schematic view showing a construction of a document urging unit of the copying apparatus according to Embodiment 1 of the invention

FIG. 2 is a partly cutaway perspective view showing an internal construction of an essential part of a copying apparatus according to Embodiment 1 of this invention. FIG. 3 is a schematic view showing an overall inner construction of the copying apparatus of this invention. FIG. 4 shows a construction of a document urging unit in the copying apparatus of this invention. The copying apparatus according to Embodiment 1 of this invention, as shown in FIG. 3, comprises largely a document urging unit 60 for transporting and urging a document, a book scanner unit (image reading unit) 50 for reading an image from the document, and a recording unit 100 for forming the image read from the document on recording paper.

The copying apparatus according to Embodiment 1 of this invention has a so-called "book scanner unit" which reads a surface of a book document put on a top surface of a document mounting glass 50h by moving an optical system relative to the book document to perform a sub-scan over the book document, and a so-called "sheet scanner unit" disposed above the document mounting glass 50h which reads a sheet document by moving it by means of a document feeding device having a sheet separation mechanism to perform a Sub-scan over the sheet document (referred to as a read-as-document-moves scanning).

Compared with conventional copying machines in which the document is fed to a predetermined position and held there immovable for scanning, the copying apparatus of Embodiment 1 has the advantage of being able to simplify a scan mechanism and shorten a reading time.

This advantage is detailed as follows. As shown in FIG. 3, the book scanner unit 50 is constructed integral with the copying apparatus body and has the document mounting glass 50h at the top thereof. As shown in FIG. 2 and FIG. 3, installed above the document mounting glass 50h is the document urging unit 60 which can be opened and closed through a hinge 65 as a rotation base located at the far side of the copying apparatus.

The document urging unit 60 has three constitutional elements, as shown in FIG. 4. They are a document pressing unit 60a for urging the book document put on the document mounting glass 50h against a surface of the document mounting glass, a document feeding unit 60b for feeding sheet documents supplied into a document inlet described later, and a feed guide 60c that forms an outer side of a transport path along the document feeding unit 60b.

The document feeding unit 60b is mounted on the document pressing unit 60a so that it can be pivoted in the direction of arrow in the figure about a rotating shaft 63 extending perpendicular to the direction of document transport. The feed guide 60c is similarly mounted on the document pressing unit 60a so that it can be pivoted in the direction of arrow in the figure about a rotating shaft 64 extending perpendicular to the direction of document transport.

Further, with the feed guide 60c and the document feeding unit 60b closed as shown in FIG. 3, a continuous document transport path is formed running from a document inlet 66 to a document outlet 67. The document feeding unit 60b has a document tray 68 on which originals are stacked and a document width restriction plate 61 that align ends of the stacked originals.

Arranged along this document transport path in the document transport direction from the document inlet 66 are a separator 80, a document transport path 70a, a document registration roller 70, and a document end sensor 71. As shown in FIG. 3 and FIG. 4, in the document urging 60, an opening 78 is formed downstream of the document end sensor 71 with respect to the document transport direction. Beneath the opening 78 is provided a glass 91 for the read-as-document-moves scanning (or scanning glass) fixedly secured to the copying apparatus body.

Further, as shown in FIG. 2, a photo interrupter 71a is provided as a reference for the document end sensor 71 to detect the end of a document. A first document pressure roller 72 is installed in the document feeding unit 60b and has its both ends urged toward the scanning glass 91 through a bias spring 73. A sheet document passes between the first document pressure roller 72 and the scanning glass 91. In the event that the operation stops or paper jamming occurs while the document is fed, the feed guide 60c and the document feeding unit 60b are opened to release the first document pressure roller 72 from the biasing force, allowing the sheet staying in the transport path to be taken away.

Near bus of the first document pressure roller 72 is provided a first document reading point A1. A document lift slope secured to the copying apparatus body is provided downstream of the scanning glass 91 with respect to the document transport direction. The document guide slope lifts the front end of the document that has passed the first document reading point A1 and guides it upward. The document with its front end raised moves into the document transport path 70a formed between the document pressing unit 60a and the document feeding unit 60b.

In the document feeding unit 60b there is a contact image sensor 75 at a position facing the document transport path 70a. Further, in the document pressing unit 60a a second document pressure roller 76 is provided at a location opposing the contact image sensor 75. The second document pressure roller 76 has its roller shaft ends urged toward the contact image sensor 75 by a bias spring 77. This arrangement keeps the document passing over the second document pressure roller 76 in contact with the contact image sensor 75, thus forming a second document reading point A2.

Since common contact image sensors have a shallow focal depth, it is generally desired that a document be kept in intimate contact with the contact image sensor and stabilized as it is fed. It is therefore desirable to provide feed rollers, Mylar films or wheels before and after the contact image sensor 75 to stabilize a passage of the document.

As described above, since the document feeding unit 60b is mounted on the document pressing unit 60a so that it can be pivoted about its rotating shaft 63, a jammed document can be removed by pivoting the document feeding unit 60b about the rotating shaft 63 to separate the contact image sensor 75 from the second document pressure roller 76 and thereby release the second document pressure roller 76 from the biasing pressure. In this case, the rotating shaft 63 and the contact image sensor 75 are arranged parallel with each other.

Further, as shown in FIG. 3, in the copying apparatus body, the book scanner unit (image reading unit) 50 of a 2:1 reduction optical system is installed beneath the scanning glass 91 and the document mounting glass 50h.

In FIG. 2, reference number 81 represents a light source, 82 a reflection umbrella, 50a a first mirror, 50b a second mirror, and 50c a third mirror. To prevent stray light from the light source 81 from entering the contact image sensor 75 when the light source 81 is directly below the first document reading point A1, opposing guide portions 74a, 74b of the document transport path 70a are curved concave, as shown in FIG. 4, to shield light. The document transport path 70a is formed in an S shape because the opposing guide portions 74a, 74b are curved concave. The S-shaped path can also shield light from a light source (LED) 75b in the contact image sensor 75 and prevent it from reaching the first document reading point A1.

This concave shape allows the distance between the sensors that is provided to ensure a light shielding effect to be set shorter than in a reading apparatus using a straight path and thus contributes to the size reduction of the apparatus. If a contact image sensor is used, however, since rollers or wheels need to be provided before and after the contact image sensor for stabilizing the transport state of the document, as described earlier, a sufficient distance between the image sensors must be provided to accommodate the rollers.

Therefore, if both of the image sensors used to read both sides of the document are of the contact type, the provision of the rollers between the sensors for accurate reading of the document makes it necessary to provide a reasonable distance between the sensors. This gives rise to an issue of increased distance that needs to be addressed.

Further, as shown in FIG. 2 and FIG. 3, the book scanner unit (image reading unit) 50 has a CCD sensor 50e which performs a light-electricity conversion on a document image that was obtained by scanning, through mirror reflection, the document placed statically on the document mounting glass 50h. The document put on the document mounting glass 50h is illuminated to a predetermined brightness level by the light source 81 and the reflection umbrella 82, both moving together with the first mirror 50a. The image of the document is then reflected by the second mirror 50b and the third mirror 50c to enter a lens group 50d and then the CCD sensor 50e, where it is converted from a light signal to an electric signal which is then sent to an image processing unit (CPU 307 in FIG. 1).

When a static document is to be read, the first mirror 50a travels a distance A3 directly below the document mounting glass 50h to read the document When a sheet document put on an upper part of the document urging unit 60 is to be read as it is transported, the first mirror 50a moves to the first document reading point A1 where it is stopped and reads the sheet document as it is transported along the document transport path 70a. The separator 80 separates one sheet at a time from the top of a stacked sheets placed on the upper part of the document urging unit 60. The separated sheet document is gripped and fed at a constant speed by the document registration roller 70 toward the first document reading point A1.

As shown in FIG. 3, below the book scanner unit (image reading unit) 50 is arranged a recording unit 100 having a recording unit and an electric unit. Designated 107 is a recording paper cassette, 106 a recording paper supply unit, 106a a registration roller, 105 a toner container, 102e a photosensitive drum, 102d a transfer roller, 104 a laser scanner unit, 102c a fusing roller, 108a an inversion flapper for back side recording, 108 an inverted paper path, and 101 a printed paper discharge unit. Because of the arrangement of the inverted paper path 108 and the transfer roller 102d, as shown, the printed paper is discharged face down.

The inversion flapper 108a as a paper path selector switches back the path of the printed paper that is being discharged toward the printed paper discharge unit 101 and feeds it to the inverted paper path 108. This printed paper passes the registration roller 106a and is fed again to the transfer roller 102d where it is formed with a back side image of the document.

Figure 1:
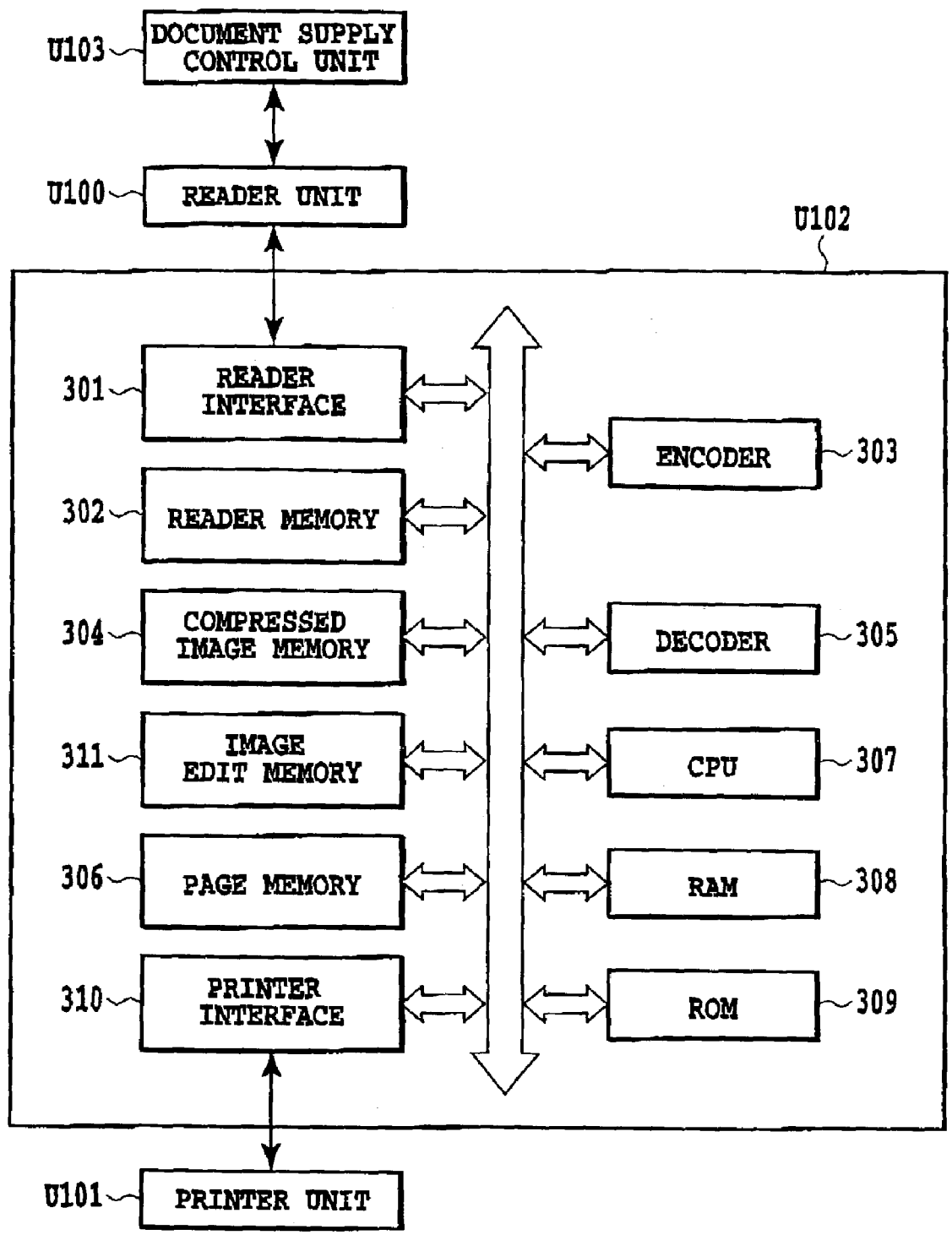
FIG. 1 is a block diagram showing an example configuration of a control system of a copying apparatus according to Embodiment 1 of the present invention.

FIG. 1 is a block diagram showing an example configuration of a control system in the copying apparatus according to Embodiment 1 of this invention. This copying apparatus has a reader unit U100 (corresponding to the book scanner unit 50 of FIG. 3), a printer unit U101 (corresponding to the recording unit 100 of FIG. 3), a controller unit U102, and a document supply control unit U103. The controller unit U102 has a reader interface 301, a reader memory 302, an encoder 303, a compressed image memory 304, a decoder 305, a page memory 306, a CPU (Central Processing Unit) 307, a RAM (Random Access Memory) 308, a ROM (Read Only Memory) 309, a printer interface 310, and an image edit memory 311.

To describe in more detail, the controller unit U102 is connected to the reader unit U100 through the reader interface 301 and also to the printer unit U101 through the printer interface 310. The reader memory 302 temporarily stores at least two pages of uncompressed image data read from the document by the reader unit U100. One page of data means image data for one A3-size large document. When reading small documents, the reader memory 302 may be divided so that two pages of small documents can be read consecutively.

The copying apparatus of Embodiment 1 of this invention realizes a simultaneous double-sided reading by which both sides of the document is read at once. During the simultaneous double-sided reading, the reader memory 302 is divided to store image data of both sides of the document read at the same time.

The encoder 303 compresses the image data stored in the reader memory 302. The compressed image memory 304 stores two or more pages of image data that was compressed by the encoder 303, The decoder 305 analyzes (expands) the compressed image data stored in the compressed image memory 304 and maps it on the page memory 306. If the magnification of the image data on the reader memory 302 is to be digitally changed, the image edit memory 311 is used. When it is magnified, for example, a linear interpolation is executed to increase the image data. The encoder 303 then compresses the edited data for storing in the compressed image memory 304.

The ROM 309 is a memory storing a control program. The CPU 307 controls various parts of the controller unit U102 according to the control program stored in the ROM 309 by executing processing shown in flow charts of FIG. 6 and FIG. 7 described later. The RAM 308 is a memory used as a work area by the CPU 307 and stores an accumulated image data management table described later. When the document reading is finished, the CPU 307 can determine whether the document read is a front side or back side. More specifically, the front/back check at the end of the reading operation is done as follows. A sensor not shown that is arranged in the document transport path controlled by the document supply control unit U103 checks whether the document being read is a front side or a back side. The document supply control unit U103 sends the check result to the CPU 307 through the reader unit U100.

At the start of each reading operation, the compressed image memory 304 allocates its areas for mapping front side data and back side data to manage the compressed image of front and back side of the document The mapping areas are dynamically changed according to the document size for efficient use of the compressed image memory 304. In a case where the compressed image memory 304 has a capacity of two pages of A3-sized document, for example, when an A4-sized document is read, the reading operation proceeds in the order of page 1 front, page 1 back, page 2 front and page 3 front. This means that the compressed image memory 304 can have two pages of page buffer (for page 2 front and page 3 front) after the page 1 front has been read until the page 1 back is read.

This memory size can be calculated from a distance between the first document reading point A1 and the second document reading point A2. The document supply control unit U103 controls the operation of a document transport device (referred to as an ADF or automatic document feeder) composed of the document feeding unit 60b and the feed guide 60c, and communicates with the reader unit U100 in performing the control. The reader unit U100 is an image reading unit corresponding to the book scanner unit 50 described above. The printer unit U101 is an image forming unit corresponding to the recording unit 100 described above.

Next, the image flow in the copying apparatus will be explained by referring to FIG. 1.

Image data of a document read by the reader unit U100 is buffered in the reader memory 302 through the reader interface 301. The image data in the reader memory 302 is compressed by the encoder 303 and stored in the compressed image memory 304. When the image data is stored in the compressed image memory 304, the image data on the reader memory 302 which was compressed by the encoder 303 is erased.

In the normal copying operation, the image data on the compressed image memory 304 is analyzed by the decoder 305 and mapped on the page memory 306 and then output to the printer unit U101. When the image is output normally to the printer unit U101, the image data on the compressed image memory 304 is erased. If, when the image data is stored in the compressed image memory 304, it is found not all image data can be accommodated in the compressed image memory 304, this is taken as a memory full state.

Figure 5:
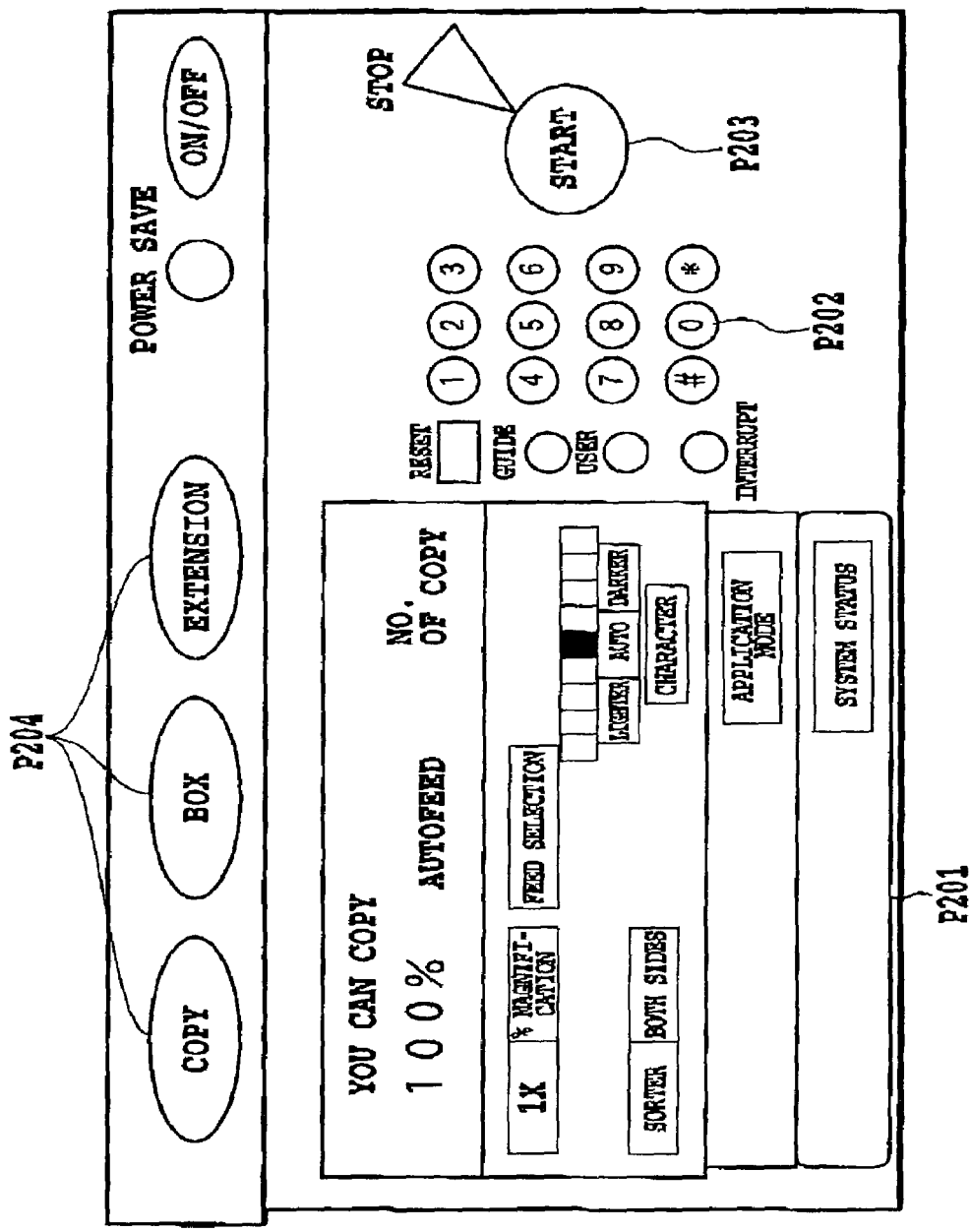
FIG. 5 is a front view showing an example configuration of an operation panel of the copying apparatus according to Embodiment 1 of the invention

FIG. 5 is a front view showing an example configuration of an operation panel in the book scanner unit 50 of FIG. 3 in the copying apparatus according to Embodiment 1 of the present invention. In FIG. 5, P201 represents a display showing an operation state and message. The surface of the display P201 is formed as a touch panel which works as a selected key (such as 1× magnification, % magnification, paper selection, density, sorter and double side). The simultaneous double-sided reading mode is set from the display P201. P202 represents a ten-key for entering numerical values to set the number of copies for each page of the original.

P203 denotes a start key which, when depressed, starts the document reading operation. P204 is a function key which, when depressed, activates a selected function from among a copying operation, a BOX operation or an extension function. The BOX operation is a function to accumulate scanned images in a hard disk (not shown) installed in the copying apparatus body.

Figure 8A:
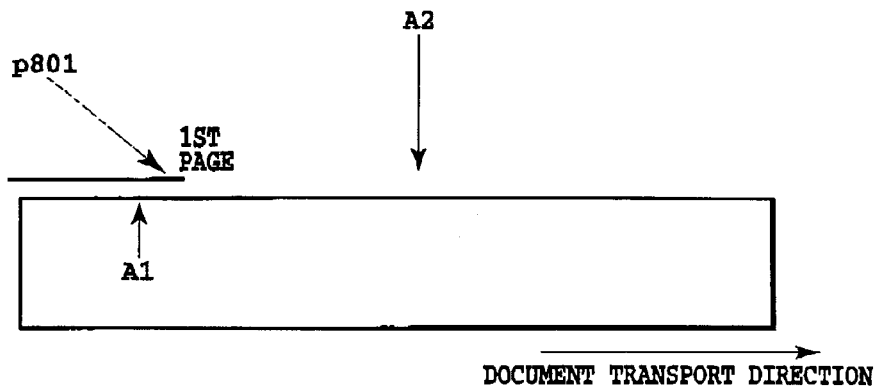
FIG. 8A to FIG. 8F illustrate how documents are read as they are transported in the double-sided document reading operation using the ADF in the copying apparatus according to Embodiment 1 of the invention.
Figure 8B:
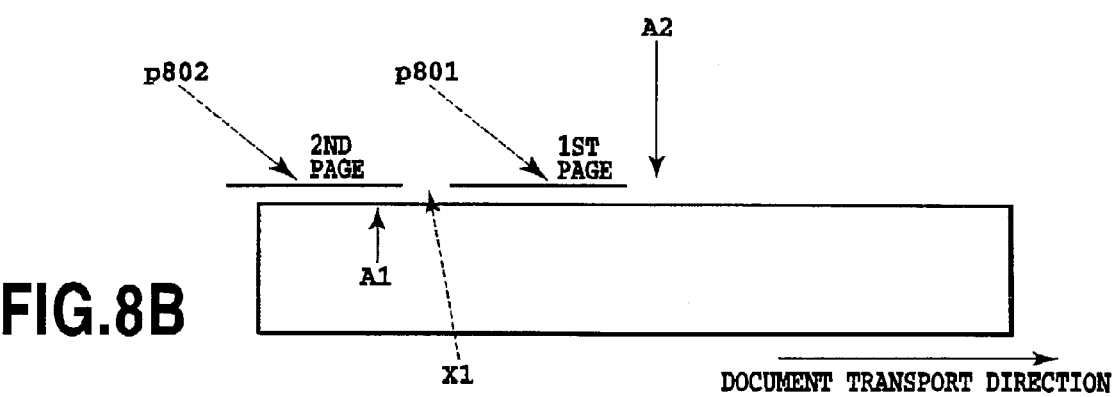

Next, a document reading completion order in the double-sided document reading operation will be explained by referring to the flow of document transport and FIG. 8A to FIG. 8F. First, a case where the document reading is completed in the order of front, front and back side will be explained by referring to FIG. 8A to FIG. 8C. In FIG. 8A a front side of a first page of document p801 begins to be read at A1. Then, in FIG. 8B the reading of the front side of the first page p801 is completed and the front side of a second page p802, which is transported at a predetermined distance X from the first page p801, starts to be read at A1.

Figure 8C:
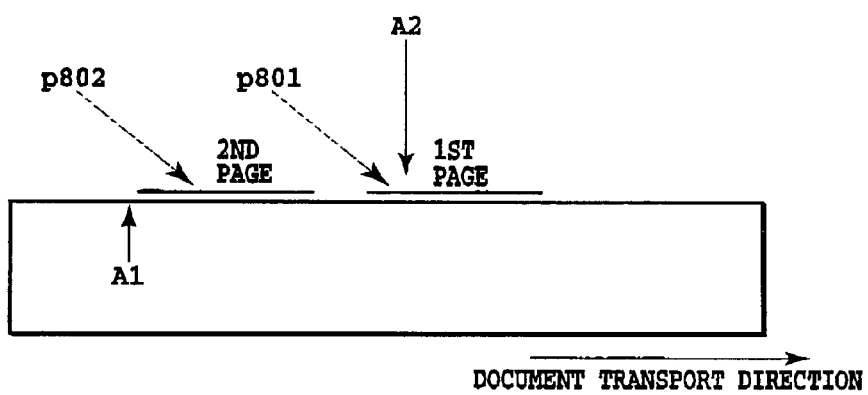

Then in FIG. 8C, when the reading of the front side of the second page p802 is finished, the back side of the first page p801 is still being read at A2. In this case, the document reading completion order is front, front and back side. That is, if the transport distance between A1 and A2 is larger than (document length+paper-to-paper interval), the front→front→back reading completion order occurs.

Next, a case where the double-sided reading is performed in the document reading completion order of front, back and front side will be explained by referring to FIG. 8D to FIG. 8F.

Figure 8D:
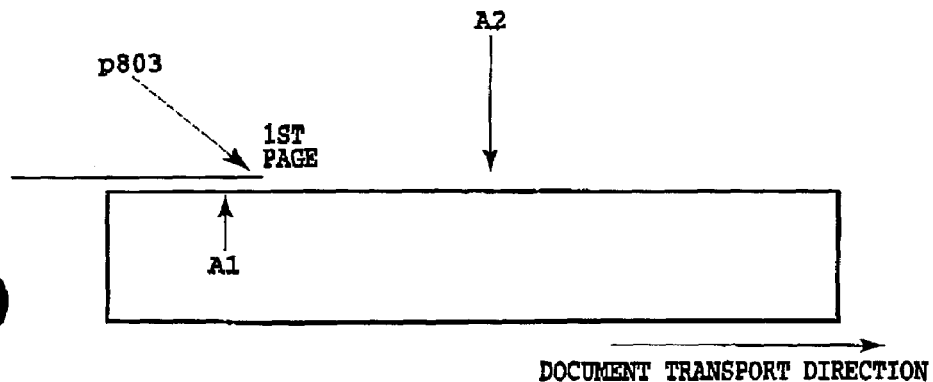
Figure 8E:
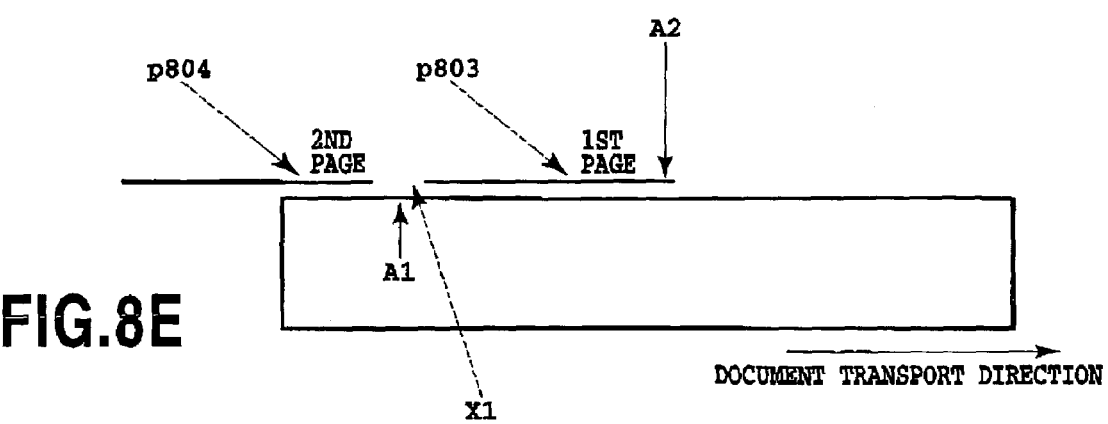
Figure 8F:
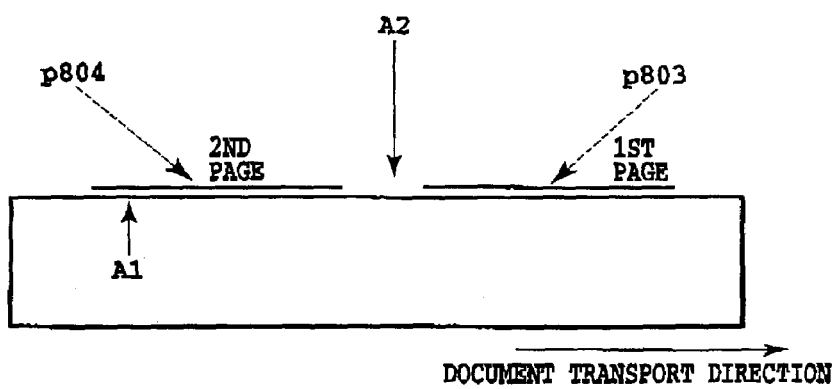

In FIG. 8D, the front side reading of a first page of document p803 is started at A1. Next, in FIG. 8E the front side reading of the first page p803 is finished and the back side of the first page p803 starts to be read at A2. At this time, a second page 804, which is fed at a predetermined distance X from the first page p803, is not yet read at A1. Then, in FIG. 8F when the reading of the back side of the first page p803 is finished, the front side of the second page p804 is still being read at A1. In this case, the document reading completion order is front, back and front side. That is, if the transport distance between A1 and A2 is smaller than (document length+paper-to-paper interval), then the front→back→front reading completion order occurs.

Next, a document reading sequence performed by the copying apparatus of the above construction according to Embodiment 1 of this invention will be explained in detail by referring to flow charts of FIG. 6 and FIG. 7.

Figure 6:
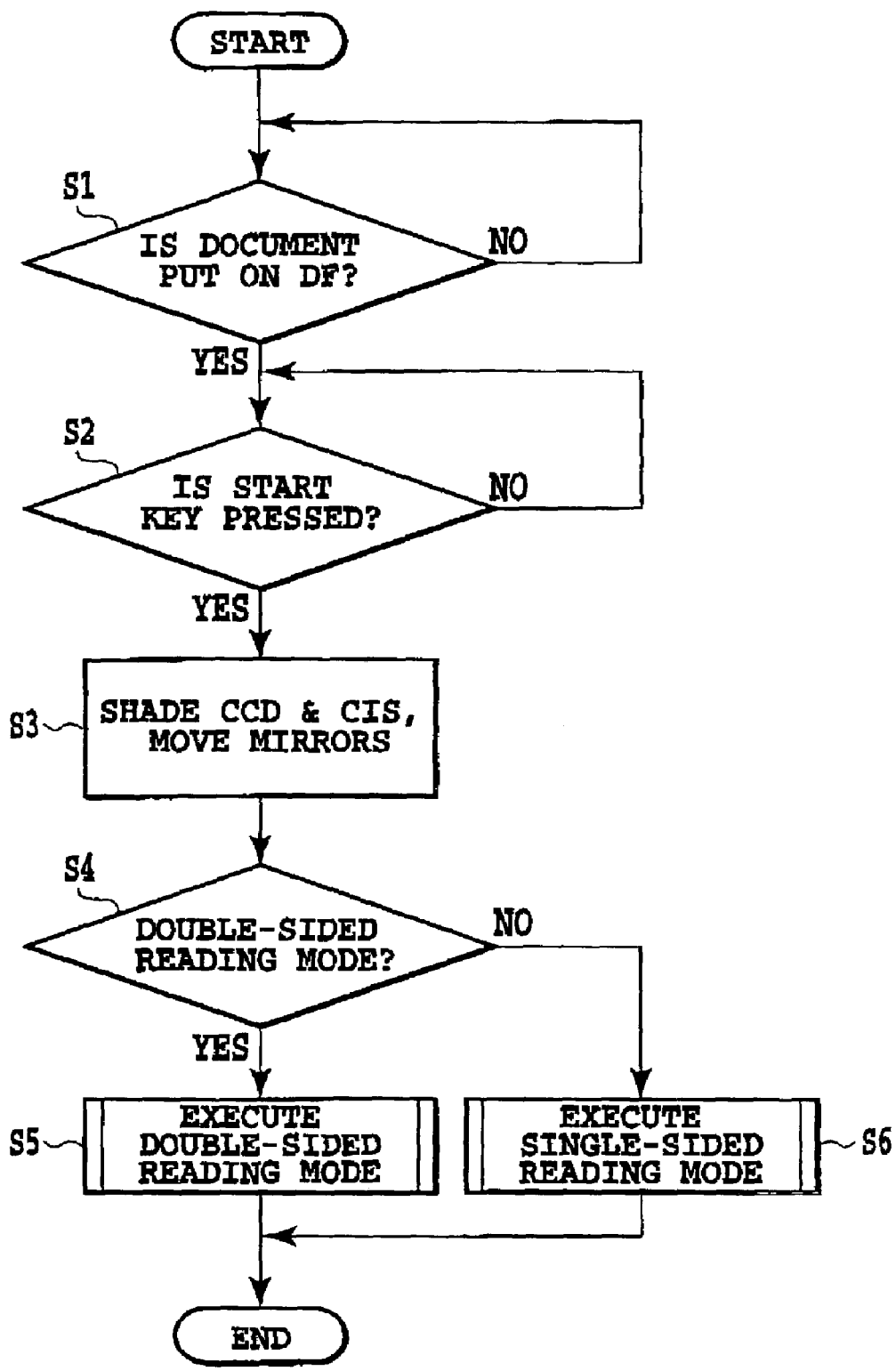
FIG. 6 is a main flow chart showing a sequence of steps performed by a document reading operation using an automatic document feeder (ADF) in the copying apparatus according to Embodiment 1 of the invention.
Figure 7:
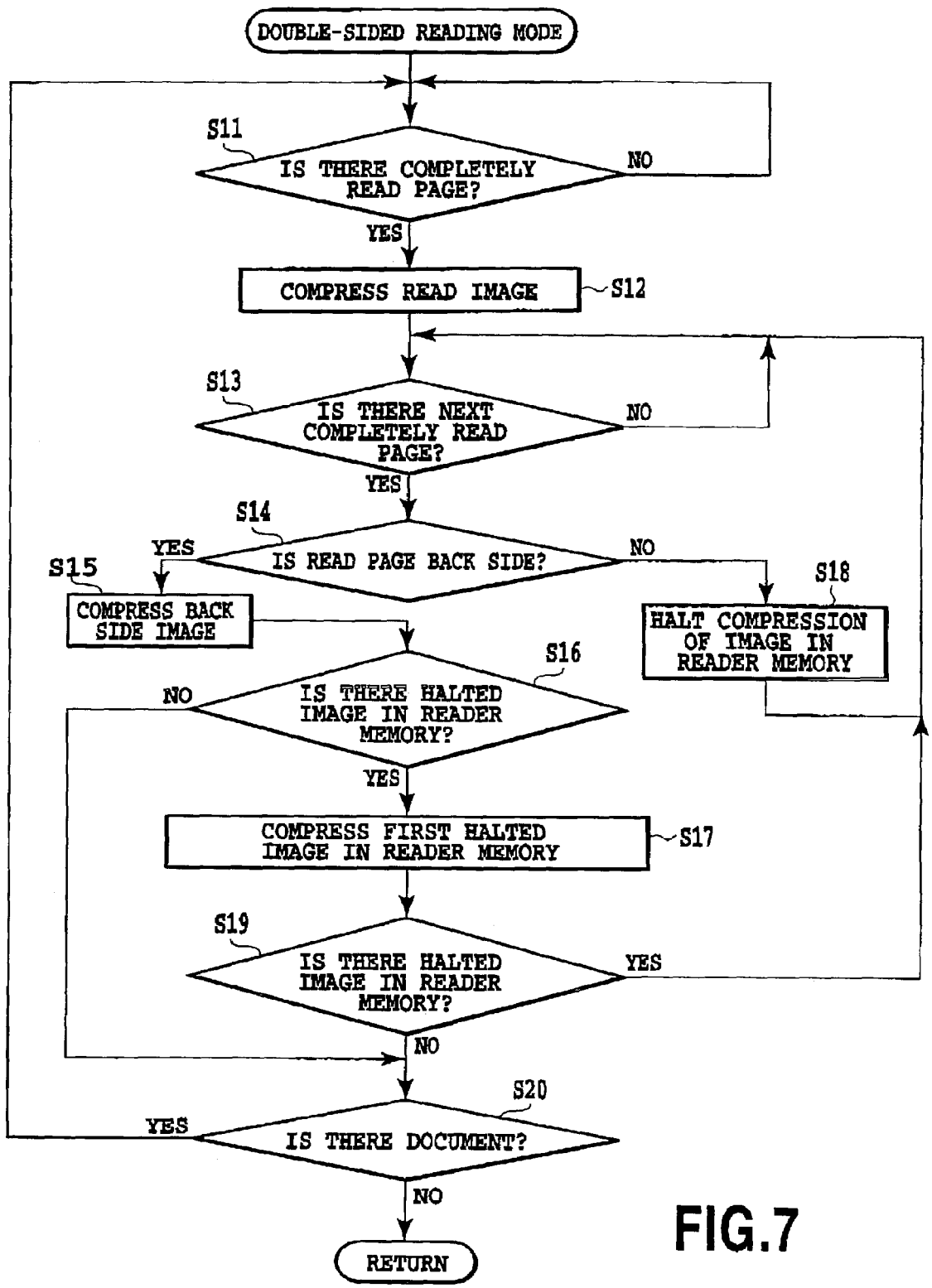
FIG. 7 is a flow chart showing a double-sided document reading operation using the ADF in the copying apparatus according to Embodiment 1 of the invention.

The flow charts of FIG. 6 and FIG. 7 are executed by the CPU 307 of the controller unit U102. CIS in the flow charts represents a contact image sensor. First, step S1 waits for a document to be set on the ADF of the copying apparatus. Whether the document is set on the ADF is determined by a document sensor 71 detecting the presence of the document when the document is inserted into the document inlet 66. When step S1 decides that the document is set on the ADF, the processing moves to step S2 where it waits for the start key P203 on the operation panel to be pressed. Next at step S2, when it is decided that the start key P203 is depressed, the processing proceeds to step S3, where it shades the contact image sensor 75 and the CCD sensor 50*e*, moves mirrors 50*a*-50*c* and have them stand by at a position that allows the scan to be performed at the first document reading point A1.

Next, the processing moves to step S4 where it determines whether the document reading mode is a double-sided reading mode that reads both sides of the document at once. If step S4 decides that the document reading mode is a double-sided reading mode, the processing moves to step S5 where it executes the double-sided reading. The double-sided reading will be described later by referring to the flow chart of FIG. 7. If step S4 decides that the document reading mode is not the double-sided reading mode, the processing proceeds to step S6 where it performs a one-sided document reading.

The one-sided reading is performed by reading the surface of a document at the first document reading point A1 as the document is transported at a predetermined speed, as described above. The image read from the document is buffered in the reader memory 302 through the reader interface 301 of FIG. 1, and the image data in the reader memory 302 is compressed by the encoder 303 and stored in the compressed image memory 304. Then, after step S5 or step S6 are completed, the document reading process is ended.

Next, the double-sided reading mode in step S5 of FIG. 6 will be explained by referring to the flow chart of FIG. 7 and FIG. 8A to FIG. 8F.

First, step S11 checks if there is image data that has been completely read. As described above, the front side of the document is read at the first document reading point A1 as it passes, and the back side of the document is read at the second document reading point A2 as it passes. Step S11 waits for the reading of the front side of a document page to be completed.

When step S11 decides that a page reading is finished, the processing moves to step S12 where the image data which is completely read and stored in the reader memory 302 is compressed by the encoder 303 and stored in the compressed image memory 304. As described above, when the image data is stored in the compressed image memory 304, the image data in the reader memory 302 is erased.

With step S12 executed, step S13 checks if there is another image data whose reading operation is finished. If at step S13 it is decided that the reading is finished, the processing moves to step S14 which determines whether the completely read image data is the back side data of the document read at step S11. When, for example, the transport distance between A1 and A2 is larger than (document length+paper-to-paper interval), the document reading is completed in the order of front→front→back side, as described above. In that case, the image data that has been completely read is not the back side data of the document read at step S11.

If step S14 decides that the completely read image data is not the back side data of the document read by step S11, the processing moves to step S18 where the compression of the image data in the reader memory 302 is stopped and the image data is held as is. After step S18 is executed, the processing returns to step S13 which checks if there is next completely read image data. Step S14 operates to execute the processing of step S18 a plurality of times if a plurality of pages are accommodated in the transport distance between A1 and A2.

If step S14 determines that the completely read image data is the back side data of the document read by step S11, the processing compresses the back side data by step 15 before moving to step S16 where it checks whether there is image data held in the reader memory 302. If step S16 decides that there is image data in the reader memory 302, the processing moves to step S16. In step S17, when there are a plurality of image data, the first image data held in the reader memory 302 is compressed by the encoder 303 and stored in the compressed image memory 304.

As described above, when the image data is stored in the compressed image memory 304, the image data held in the reader memory 302 is erased. With step S17 executed, the processing moves to step S19 which checks if there is another image data held in the reader memory 302. If step S19 decides that the reader memory 302 still holds image data, the processing returns to step S13 which checks if there is next completely read image data.

If on the contrary step S16 decides that there is no image data held in the reader memory 302, the processing moves to step S20 to check whether there is a next document to be read. Whether there is a next document or not is determined by the document sensor 71. If there is a next document to be read, the processing returns to step S11. If there is no document to be read, the processing returns to the main processing of FIG. 6.

Similarly, if step S19 decides that there is no image data held in the reader memory 302, the processing moves to step S20 to check if a next document to be read exists.

As described above, Embodiment 1 of this invention can provide a document reading apparatus in which, when the document reading mode is set to the double-sided reading mode for simultaneously reading both sides of a document by the read-as-document-moves scanning function and if the front side reading and the back side reading are not completed in that order for each page of document depending on the document size, the CPU 307 of the copying apparatus can perform the image compression control by software in a manner that stores in one image storage device the front and back side image data in the order of the document pages.

Embodiment 2

Embodiment 2 of this invention performs the similar steps to those of Embodiment 1 described above with reference to FIG. 1 to FIG. 8F. Only those steps in Embodiment 2 that differ from Embodiment 1 will be described by referring to FIG. 9 and FIG. 10. The feature of Embodiment 2 lies in a document reading method when the memory capacity of the reader memory 302 is minimized. This method compresses image data into the compressed image memory 304 as soon as it is completely read into the reader memory 302, thereby minimizing the capacity of the reader memory 302. The reason for minimizing the capacity of the reader memory 302 is that the reader memory 302 is normally required to use a fast memory such as SDRAM for fast transfer of video data while the compressed image memory 304 does not need so fast an access and thus can use an inexpensive hard disk. Utilizing the compressed image memory 304 to its full extent can realize an inexpensive product. In the flow chart, a word "lock" means that a limitation is imposed on the use of the image data in the compressed image memory 304 as print data for copying or as FAX transmission data. More specifically, the image data from the reader unit U100 is read into the compressed image memory 304 in the controller unit U102 at as high a speed as possible and, when the image data in the compressed image memory 304 is to be used as print data for copying or as FAX transmission data, the reading of this image data is enabled or disabled according to a status of the image data. Among processing performed during the image reading operation are (1) a storing of an image into the reader memory 302, (2) a compressing and storing of an image into the compressed image memory 304, and (3) a changing of status of compressed image data, with these processing having a relation of (1)>(2)>(3) in the order of the length of time taken to complete processing. During the copying operation or FAX transmission, therefore, the double-sided reading that takes full advantage of the reader performance is normally executed. When the reading order changes, the processing (3) is executed. This method is expected to improve the overall performance of the product.

FIG. 10 shows one example of an accumulated image data management table according to this embodiment. An image reading/retrieval control in the compressed image memory 304 will be described by referring to FIG. 10. The accumulated image data management table is stored in the RAM 308 of FIG. 1.

First, during the image reading process, the memory locations in the compressed image memory 304 in which image data is compressed and stored are represented by a series step number 912. In the example shown in FIG. 10, the reading of image data 901-910 consists of two jobs (job identification is written into 911 at the start of a job when the first image reading step is executed). When six pages of document are read in the order of page 1 front, page 1 back, page 2 front, page 2 back . . . , the read-out number 913 representing the order in which the image data is to be read out by using the decoder 305 is set in the same order that the images are compressed and stored in the compressed image memory 304 (=series step number), as shown at image data 901-903.

In a case where a plurality of pages of document are double-sided read in the order of page 1 front, page 2 front, page 1 back and page 3 front, the read-out number 913 for sequentially reading the image data by using the decoder 305 is set in a different order than that in which the images are compressed and stored in the compressed image memory 304, i.e., is skipped or advanced by one to an out-of-sequence number (=page number), as shown at image data 907-910. Let us look at the status of image data 910. When the read-out number 913 of "4" is skipped (i.e., the reading of back side of page 2 is not yet finished), the read-out operation using the decoder 305 is inhibited (=status 914 of this image data 910 reads "locked"; otherwise it normally reads "reading finished"). Then, after the reading of back side of second page is finished and the image data is compressed and stored in the compressed image memory 304, the image data 910 is unlocked (=status of image data 910 now reads "reading finished").

Figure 9:
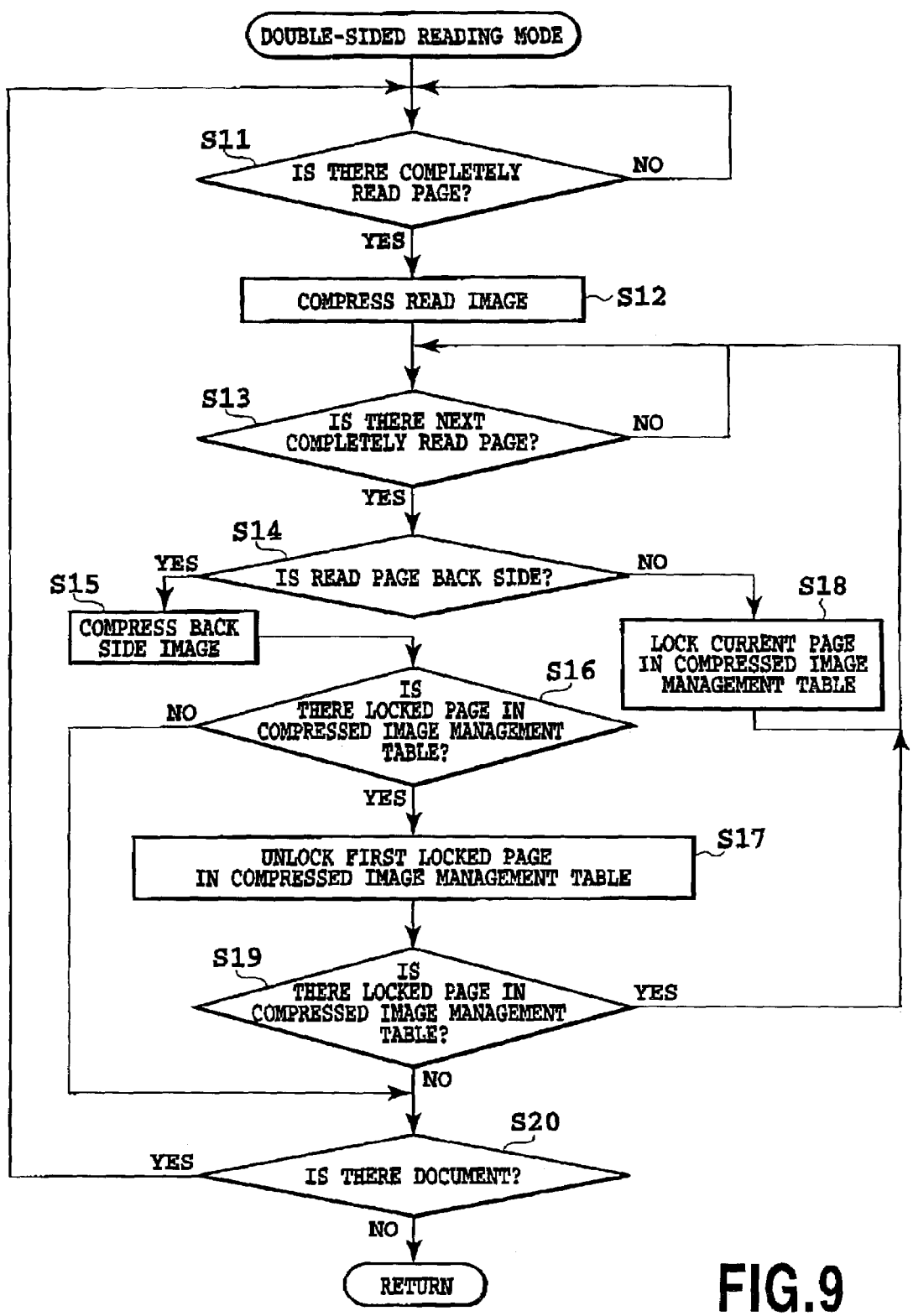
FIG. 9 is a flow chart showing a double-sided document reading operation using an ADF in a copying apparatus according to Embodiment 2 of the invention.

Next, the document reading sequence in the copying apparatus of the second embodiment of this invention constructed as described above will be detailed by referring to the flow charts of FIG. 6 and FIG. 9.

The flow charts shown in FIG. 6 and FIG. 9 are executed by the CPU 307 of the controller unit U102. CIS in the flow charts represents a contact image sensor.

First, step S1 waits for a document to be set on the ADS of the copying apparatus. Whether the document is set on the ADF is determined by the document sensor 71 detecting the presence of the document when the document is inserted into the document inlet 66. When step S1 decides that the document is set on the ADF, the processing moves to step S2 where it waits for the start key P203 on the operation panel to be depressed.

At step S2, when it is decided that the start key P203 is depressed, the processing proceeds to step S3, where it shades the contact image sensor 75 and the CCD sensor 50e, moves mirrors 50a-50c and have them stand by at a position that allows the scan to be performed at the first document reading point A1.

Next, the processing moves to step S4 where it determines whether the document reading mode is a double-sided reading mode that reads both sides of the document at once. If step S4 decides that the document reading mode is a double-sided reading mode, the processing moves to step S5 where it executes the double-sided reading. The double-sided reading will be described later by referring to the flow chart of FIG. 9. If step S4 decides that the document reading mode is not the double-sided reading mode, the processing proceeds to step S6 where it performs a one-sided document reading.

The one-sided reading is performed by reading the surface of a document at the first document reading point A1 as the document is transported at a predetermined speed, as described above. The image read from the document is buffered in the reader memory 302 through the reader interface 301 of FIG. 1, and the image data in the reader memory 302 is compressed by the encoder 303 and stored in the compressed image memory 304. Then, after step S5 or step S6 are completed, the document reading process is ended.

Next, the double-sided reading mode in step S5 of FIG. 6 will be described by referring to the flow chart of FIG. 9 and FIG. 10.

First, step S11 checks if there is image data that has been completely read. As described above, the front side of the document is read at the first document reading point A1 as it passes, and the back side of the document is read at the second document reading point A2 as it passes. Step S11 waits for the reading of the front side of a document page to be completed.

When step S11 decides that a page reading is finished, the processing moves to step S12 where the image data which is completely read and stored in the reader memory 302 is compressed by the encoder 303 and stored in the compressed image memory 304. As described above, when the image data is stored in the compressed image memory 304, the read-out number 913 and the status 914 are also written.

With step S12 executed, step S13 checks if there is another image data whose reading operation is finished. If at step S13 it is decided that the reading is finished, the processing moves to step S14 which determines whether the completely read image data is the back side data of the document read at step S11. When, for example, the transport distance between A1 and A2 is larger than (document length+paper-to-paper interval), the document reading is completed in the order of front→front→back side, as described above. (In that case, the image data that has been completely read is not the back side data of the document read at step S11.

If step S14 decides that the completely read image data is not the back side data of the document read by step S11, the processing moves to step S18 where, when the completely read image data in the reader memory 302 is compressed by the encoder 303 and stored in the compressed image memory 304, a read-out number 913 skipped or advanced by one to an out-of-sequence number and a status 914 "locked" are set in the accumulated image data management table. After step S18 is executed, the processing returns to step S13 which checks if there is next completely read image data. Step S14 operates to execute step S18 a plurality of times if a plurality of pages are accommodated in the transport distance between A1 and A2.

If step S14 determines that the completely read image data is the back side data of the document read by step S11, the processing compress the back side data by step 15 before moving to step S16 where it checks whether there is compressed image data whose status 914 is locked. If step S16 decides that there is compressed image data whose status 914 is locked, the processing moves to step S17. In step S17, when the completely read image data in the reader memory 302 is compressed by the encoder 303 and stored in the compressed image memory 304, the read-out number 913 is set with the skipped, unused number. When there are a plurality of locked image data, the read-out number 913 is set with a first skipped number and then a first of the plurality of locked compressed image data is unlocked (=status 914 is of the first locked data is set to the "reading finished" state).

With step S17 executed, the processing moves to step S19 to check if there is another compressed image data whose status 914 is locked. If step S19 decides that compressed image data with its locked status 914 exists, the processing returns to step S13 to check if there is next completely read image data.

If at step S16 it is decided that there is no compressed image data with a locked status 914, the processing proceeds to step S20 where it checks if there is a next document to be read. Whether there is a next document to be read is determined by the document sensor 71. If the next document is found, the processing returns to step S11. If the next document is not found, the processing returns to the main processing of FIG. 6.

Similarly, if step S19 decides that there is no compressed image data with a locked status 914, the processing moves to step S20 to check if a next document to be read exists.

As described above, Embodiment 2 of this invention can provide a document reading apparatus in which, when the document reading mode is set to the double-sided reading mode for simultaneously reading both sides of a document by the read-as-document-moves scanning function and if the front side reading and the back side reading are not completed in that order for each page of document depending on the document size, the CPU 307 of the copying apparatus can perform setting by software during the read-out operation on the compressed images in a manner that stores in one image storage device the front and back side image data in the order of the document pages.

Although in the embodiments described above, we have taken up example cases of the present invention as applied to copying apparatus, the present invention can also be applied to other equipment, such as multiple function products with printer and facsimile functions.

While in the above embodiments, we have explained about example cases of the present invention as applied to single copying apparatus, the present invention can also be applied to a system in which an arbitrary number of copying apparatus (or multifunction apparatus) and information processing apparatus are interconnected through network.

The present invention can be applied either to a system consisting of a plurality of devices or to an apparatus consisting of a single device. What has been described above can also be realized by loading into a system or apparatus a storage medium storing program codes that realize the functions of the above embodiments and by having a computer (or CPU or MPU) of the system or apparatus read and execute the program codes in the storage medium.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A document reading apparatus comprising:
   a first document reader for reading a first side of a document while the document is being transported;
   a second document reader for reading a second side of the document while the document is being transported, the second document reader disposed apart from the first document reader;
   a first memory for storing the image data read out from the first document reader and the second document reader; and
   a second memory for storing the image data of the first memory in a compressed form,
   wherein, in a case of storing image data of a first side of a first document to the first memory and then storing image data of a first side of a second document continues the first document into the first memory, the image data of the first side of the second document is not compressed until storage and compression of the image data of the second side of the first document to the first memory.

2. A document reading apparatus as claimed in claim 1, further comprising a management unit that manages a read-out number of the compressed image data stored in the second memory,
   wherein, in a case when storing image data of the first side of the first document to the first memory and storing image data of the first side of the second document continues the first document into the second memory, the management unit sets a next read-out number of the read-out number of the compressed image data of the first side of the first document to a skipped number, and the next read-out number is a read-out number of the compressed image data of the first side of the second document.

3. A document reading apparatus as claimed in claim 2,
   wherein the image data of the first and second sides is first stored in the first memory and then read from the first memory, compressed and stored in the second memory, and
   wherein the image data stored in the first memory not in a predetermined order are halted from being compressed and stored in the second memory.

4. A document reading apparatus as claimed in claim 1, wherein, if a length of the document in the transport direction is shorter than a paper transport distance between the first document reader and the second document reader, the image data of the first and second sides is not stored in the predetermined order.

5. A document reading apparatus as claimed in claim 1,
   wherein the image data of the first and second sides is first stored in the first memory and then read from the first memory and compressed and stored in the second memory, and
   wherein the image data stored in the first memory not in a predetermined order is halted from being compressed and stored in the second memory.

6. A document reading apparatus as claimed in claim 5, wherein, upon completion of the storing in the first memory of that image data which corresponds to a second side of a the halted image data, the halted image data is compressed.

7. A document reading apparatus as claimed in claim 5, wherein, upon completion of the storing in the first memory of that image data which corresponds to a second side of the halted image data, a first of a plurality of the halted image data completely mapped in the first memory is compressed and accumulated.

8. A document reading apparatus as claimed in claim 1,
wherein the image data of the first and second sides is first stored in the first memory and then read from the first memory and compressed and stored in the second memory, and
wherein an accumulated image management unit is provided which manages the image data accumulated by a compression and accumulation unit and, the accumulated image management unit locks the accumulated image data from being accessed, regardless of an order of pages of the document stored in the second memory.

9. A document reading apparatus as claimed in claim 8, wherein, upon completion of the storing the image data which corresponds to a second side of a locked image data in the second memory, the accumulated image management unit unlocks the locked image data.

10. A document reading apparatus as claimed in claim 8, wherein, upon completion of storing the image data which corresponds to a second side of a locked image data in the second memory, the accumulated image management unit unlocks the first locked image data of a plurality of the locked image data.

11. A document reading apparatus as claimed in claim 1, wherein a read-out number setting unit is provided which sets a read-out number representing an order in which the image data stored in the second memory is read out and the read-out number setting unit skips or advances the read-out number of the accumulated image data by one, regardless of an order of page of the document stored in the second memory.

12. A document reading apparatus as claimed in claim 11,
wherein the image data of the first and second sides is first stored in the first memory and then read from the first memory and compressed and stored in the second memory, and
wherein, upon completion of the storing in the second memory of that image data which corresponds to a second side of skipped image data, the read-out number setting unit assigns a skipped, unused read-out number to the image data corresponding to the second side of the skipped image data.

13. A document reading apparatus as claimed in claim 11,
wherein the image data of the first and second sides is first stored in the first memory and then read from the first memory and compressed and stored in the second memory, and
wherein, upon completion of the storing the image data which corresponds to a second side of a skipped image data in the second memory, the read-out number setting unit assigns the first skipped, unused read-out numbers to the image data corresponding to the second side of the skipped image data of a plurality of the skipped image data.

14. A document reading method comprising:

a first document reading step of reading a first side of a document by a first document reader while the document is being transported;

a second document reading step of reading a second side of the document by a second document reader disposed apart from the first document reader while the document is being transported;

a first storing step for storing image data read out by the first document reader and the second document reader; and a second storing step of storing the image data in a compressed form, wherein, in a case of storing of image data of a first side of a first document to the first memory and then storing of image data of a first side of a second document continues the first document into the first memory, the image data of the first side of the second document is not compressed until storage and compression of the image data of the second side of the first document.

* * * * *

UNITED STATES PATENT AND TRADEMARK OFFICE
CERTIFICATE OF CORRECTION

| | | |
|---|---|---|
| PATENT NO. | : 7,345,794 B2 | |
| APPLICATION NO. | : 10/358230 | |
| DATED | : March 18, 2008 | |
| INVENTOR(S) | : Noriaki Matsui | |

It is certified that error appears in the above-identified patent and that said Letters Patent is hereby corrected as shown below:

COLUMN 2:
      Line 28, "a" should be deleted.

COLUMN 3:
      Line 3, "the storing the" should read -- the storing of the --;
      Line 31, "storing" should read -- storing of --;
      Line 38, "comprising:" should read -- comprises: --; and
      Line 58, "forth" should read -- fourth --.

COLUMN 4:
      Line 6, "forth" should read -- fourth --;
      Line 21, "of" should read -- whether --; and
      Line 27, "a" should be deleted.

COLUMN 5:
      Line 52, "Sub-scan" should read -- sub-scan --.

COLUMN 7:
      Line 66, "document" should read -- document. --.

COLUMN 8:
      Line 5, "of a" should read -- of --; and
      Line 54, "is" should read -- are --.

COLUMN 9:
      Line 23, "document" should read -- document. --.

COLUMN 11:
      Line 2, "have" should read -- has --.

UNITED STATES PATENT AND TRADEMARK OFFICE
CERTIFICATE OF CORRECTION

PATENT NO. : 7,345,794 B2
APPLICATION NO. : 10/358230
DATED : March 18, 2008
INVENTOR(S) : Noriaki Matsui It is certified that error appears in the above-identified patent and that said Letters Patent is hereby corrected as shown below:

COLUMN 13:
    Line 5, "processing" should read -- processings --.

COLUMN 14:
    Line 1, "have" should read -- has --.

COLUMN 17:
    Line 19, "the" (second occurrence) should read -- of the --.

Signed and Sealed this

Twenty-sixth Day of August, 2008

JON W. DUDAS
*Director of the United States Patent and Trademark Office*